United States Patent [19]

Kanasashi

[11] Patent Number: 5,313,514
[45] Date of Patent: May 17, 1994

[54] HANDS FREE APPARATUS FOR LAND MOBILE RADIO TELEPHONE

[75] Inventor: Hisanori Kanasashi, Yamato, Japan

[73] Assignee: Matsushita Electric Industrial Co., Ltd., Osaka, Japan

[21] Appl. No.: 836,954

[22] Filed: Feb. 19, 1992

[30] Foreign Application Priority Data

| May 7, 1991 | [JP] | Japan | 3-101270 |
| May 7, 1991 | [JP] | Japan | 3-101282 |
| May 21, 1991 | [JP] | Japan | 3-116111 |
| Aug. 21, 1991 | [JP] | Japan | 3-209176 |
| Aug. 21, 1991 | [JP] | Japan | 3-209177 |
| Aug. 21, 1991 | [JP] | Japan | 3-209187 |

[51] Int. Cl.$^5$ .......................................... H04M 11/00
[52] U.S. Cl. ........................ 379/58; 379/420; 379/406
[58] Field of Search ............ 379/58, 59, 406, 420, 379/432, 447, 454, 455; 455/89, 90; 381/90, 169

[56] References Cited

U.S. PATENT DOCUMENTS 5,031,872  7/1991  Vance et al. .................. 381/169
5,054,115  10/1991  Sawa et al. .................... 455/89

OTHER PUBLICATIONS

Mitsubishi International Corporation Brochure, "Portable Cellular Telephone" (Model 3000), copyright 1991 (assumed Jan. 1. 1991).

Primary Examiner—Curtis Kuntz
Assistant Examiner—Dwayne D. Bost
Attorney, Agent, or Firm—Stevens, Davis, Miller & Mosher

[57] ABSTRACT

In a land mobile radio telephone apparatus, a microphone unit for inputting speeches to be transmitted in incorporated in a plug that can be connected to a cigar lighter socket provided near a driver's seat in a vehicle, and the plug with the microphone unit built therein is connected to a radio telephone apparatus body via cables for supplying power from a power source and a cable for inputting the speech voices. A speaker unit is built in the radio telephone apparatus body. An end portion of a casing of the plug is formed into a tubular shape, and the microphone having a directivity is incorporated in the tubular end portion in such a manner that it can be semi-fixed. Directivity of the microphone is thus directed toward the driver. The microphone unit has a directivity adjusting mechanism, and is supported by supporting member having a vibration-proof effect. Furthermore, a noise removing circuit is provided between the microphone unit and a circuit unit for suppressing sound coupling between the microphone unit and the speaker unit.

6 Claims, 5 Drawing Sheets

HANDS FREE APPARATUS FOR LAND MOBILE RADIO TELEPHONE

BACKGROUND OF THE INVENTION

1. Field of the Invention

The present invention relates to a radio telephone apparatus, such as a hand-free type land mobile radio telephone apparatus.

2. Description of the Related Art

A connectional hand free type land mobile radio telephone apparatus has a system configuration thereof as shown in a schematic diagrammatic view of FIG. 9. As can be seen from FIG. 9, a microphone unit 1 for inputting speech voices to be transmitted and a speaker unit 2 for outputting received speech voices are connected to a suppressing circuit unit 4 provided in a radio telephone apparatus body 3 for suppressing singing or the like, and a radio telephone circuit 5 provided in the radio telephone apparatus body 3 is connected to an antenna 6.

The aforementioned type of conventional hand-free type radio telephone apparatus is installed in a vehicle in the manner shown in FIG. 10. As can be seen in FIG. 10, the microphone unit 1 is provided near a driver's seat 11, i.e., it is supported on a sun visor 13 provided on a wind shield 12 above and in front of the driver's seat 11. The microphone unit 1 is connected to the radio telephone apparatus body 3 provided at a desired site via a microphone cable 14 installed along, for example, an inner wall of the vehicle so that a speech voice made by the driver can be input to the radio telephone apparatus body 3 via the microphone cable 14. At the central portion of the vehicle and near the driver's seat 11 is provided the speaker unit 2, which is connected to the radio telephone apparatus body 3 via a speaker cable 15 so that the signal received by the radio telephone apparatus body 3 can be output in the form of a voice from the speaker unit 2. A cigar lighter socket 16 is provided at the central portion of the vehicle and near the driver's seat 11, and a power source plug 18 provided at one end of a power source cable 17 is connected to the cigar lighter socket 16. The other end of the power source cable 17 is connected to the radio telephone apparatus body 3. Consequently, power is supplied from the cigar lighter socket 16 to the radio telephone apparatus body 3 via the power source cable 17. The microphone unit 1 may be provided at a site other than on the sun visor 13 where it does not interrupt the driver's driving operation and where it can input the driver's speech voices, e.g., it may be provided near a steering column 20 for supporting a steering wheel 19. The speaker unit 2 may also be provided at a site other than the aforementioned one under the same conditions as those of the microphone unit 1.

In the conventional land mobile radio telephone apparatus having the aforementioned structure, a speech voice made by a speaker, i.e., of a driver 7, is input from the microphone unit 1 to the radio telephone circuit 5 of the land mobile radio telephone apparatus body 3 through the suppressing circuit 4 for suppressing singing caused by sound coupling between the speech voice to be transmitted and the received speech voice. The speech voice which has been processed for transmission by the radio telephone circuit 5 is transmitted from the antenna 6 to a remote speaker via a land mobile telephone station. The speech voice from the remote speaker is received by the radio telephone circuit 5 via the land mobile telephone station. The received speech voice is passed through the path opposed to that mentioned above and is output from the speaker 2 so that the driver 7 can listen to it.

In the interior of the vehicle, the power source cable 17, the microphone cable 14 and the speaker cable 15 are externally led from the radio telephone apparatus body 3. Among these cables, the microphone cable 14 is longest, and must thus be installed at a site where it does not interrupt the driver's driving operation. Hence, the microphone cable 14 is fixed at a site where it does not degrade the driver's visibility and where it does not come off by the vibrations generated during travel. However, installation of this microphone cable 17 is a troublesome work. The microphone cable 14 which comes off from its fixed site due to vibrations generated during travel or the like may interfere with the driving operation.

Furthermore, since the radio telephone apparatus body 3 is supplied with power from the cigar lighter socket 16 in the vehicle, when the land mobile telephone apparatus is used in another vehicle, the power source cable 17 is also required. This makes fixing of the power source cable 17 in the vehicle impossible. When the land mobile radio telephone apparatus is used in another vehicle, the speaker 2 and the speaker cable 15 must also be moved together with the radio telephone apparatus body 3 and be installed at a site where they do not interfere with the driver's operation, which is a troublesome work. Removal of the speaker cable 15 due to vibrations generated during travel interferes with the driver's driving operation and makes driving a dangerous work.

In such a land mobile radio telephone apparatus, telephone calls are generally made while the vehicle is travelling. In that case, telephone conversations are frequency made without the use of a hand-held handset from the viewpoint of safety of driving. However, in that case, since the microphone 1 and the speaker 2 are spaced from each other, if a telephone call is made at a site of a heavy traffic, conversations may be transmitted to the other party together with an undesired noise generated around the microphone unit 1, thus greatly deteriorating the S/N ratio of the aural signal received by the other party and thus making communications between two parties difficult. The telephone conversations made without use of a hand-held handset while the vehicle is at a stop may also be buried in the background noise.

Furthermore, in the conventional radio telephone apparatus, since the distance between the user 1 and the microphone unit 1 is longer than in the normal case where telephone conversations are made using a handset, an undesired noise in the interior of the vehicle are input to the microphone unit 1 together with the telephone conversations. The input noise is mixed into an aural signal and such an aural signal is transmitted to the other party, thus deteriorating the S/N ratio of the signal and making communications difficult.

SUMMARY OF THE INVENTION

In view of the aforementioned problems of the conventional radio telephone apparatus, an object of the present invention is to provide a land mobile radio telephone apparatus which eliminates the need to install a separate cable for the microphone to facilitate the installation of the overall device and to avoid any interference with the driving operation that might be caused when the microphone cable of the prior art comes loose.

Another object of the present invention is to provide a land mobile radio telephone apparatus which eliminates installation works of a speaker unit and a speaker cable to improve installation work.

Still another object of the present invention is to provide a land mobile radio telephone apparatus which eliminates deterioration in the S/N ratio of an aural signal and which thus enables an aural signal having a high S/N ratio to be transmitted to a remote party.

Still another object of the present invention is to provide a land mobile radio telephone apparatus which reduces the possibility that the noise caused by vibrations during travel is mixed into an aural signal, and which thus enables an aural signal having a high S/N ratio to be transmitted to a remote party.

To achieve the aforementioned object of the present invention, there is provided a land mobile radio telephone apparatus which is characterized in that a microphone unit for inputting speeches to be transmitted is incorporated in a plug that can be connected to a cigar lighter socket provided near a driver's seat in a vehicle, and in that the plug with the microphone unit built therein is connected to a radio telephone apparatus body via cables for supplying power from a power source and a cable for inputting the speech voices.

To achieve another object of the present invention, there is provided a land mobile radio telephone apparatus which is characterized in that a microphone unit for inputting speeches to be transmitted is incorporated in a plug that can be connected to a cigar lighter socket provided near a driver's seat in a vehicle, in that the plug with the microphone unit built therein is connected to a radio telephone apparatus body via cables for supplying power from a power source and a cable for inputting the speeches, and in that a speaker unit for outputting received speech voices is built in the radio telephone body.

The present invention further provides a land mobile radio telephone apparatus to which power is supplied from a vehicle-mounted battery through a cigar lighter plug that can be inserted into a cigar lighter socket, and which is characterized in that an end portion of a casing of the cigar lighter plug is shaped in a tubular form, in that a microphone having a directivity is incorporated in the tubular end portion in such a manner that it can be semi-fixed, and in that the directivity of the microphone is directed toward a driver.

The present invention further provides a land mobile radio telephone apparatus which includes: a radio telephone apparatus body disposed in a vehicle, power being supplied to the apparatus body via cables from a cigar lighter plug that can be inserted into a cigar lighter socket provided in front of a driver's seat in the vehicle; a microphone unit incorporated in the cigar lighter plug for inputting speeches to be transmitted; and a speaker unit for outputting received speech voices and a circuit unit for suppressing sound coupling of the microphone unit and the speaker unit, the speaker unit and the suppressing circuit being provided in the radio telephone apparatus body, and which is characterized in that the microphone unit for inputting speeches to be transmitted, the microphone unit having an adjustable directivity, is provided in the cigar lighter plug by means of a directivity adjusting mechanism.

The present invention further provides a land mobile radio telephone apparatus which further includes a noise removing circuit for removing noise mixed into an aural signal and generated by an undesired noise input from the microphone unit, the noise removing circuit being provided between the microphone unit and the sound coupling suppressing circuit unit.

The present invention further provides a land mobile radio telephone apparatus in which the microphone unit provided in the cigar lighter plug is supported by a microphone supporting member exhibiting a vibration-proof effect.

In the present invention, since the microphone unit is incorporated in the plug that can be coupled to the cigar lighter socket, the microphone cable installation work can be eliminated.

Furthermore, since the speaker unit is incorporated in the radio telephone apparatus body, the speaker unit installation work and speaker cable installation work can be eliminated.

Furthermore, in the land mobile telephone apparatus according to the present invention, when a telephone call is made without use of a hand-held handset in an environment of a high noise level, the S/N ratio of the telephone conversations can be increased.

Furthermore, since the microphone unit can be adjusted such that the directivity of the microphone is always directed toward the user, an aural signal of a high S/N ratio can be transmitted to a remote party, even when the type or size of the vehicle changes.

Furthermore, since the noise in the aural signal can be removed by the noise removing circuit, an aural signal of a high S/N ratio can be transmitted to the remote party in an environment of a high noise level.

Furthermore, since the vibrations caused during travel are not transmitted directly to the microphone unit, the noise caused by the vibrations is not mixed into an aural signal, and an aural signal of a high S/N ratio can thus be transmitted to the remote party.

DETAILED DESCRIPTION OF THE PREFERRED EMBODIMENTS

Embodiments of a land mobile radio telephone apparatus according to the present invention will be described below with reference to the accompanying drawings.

Figure 1:
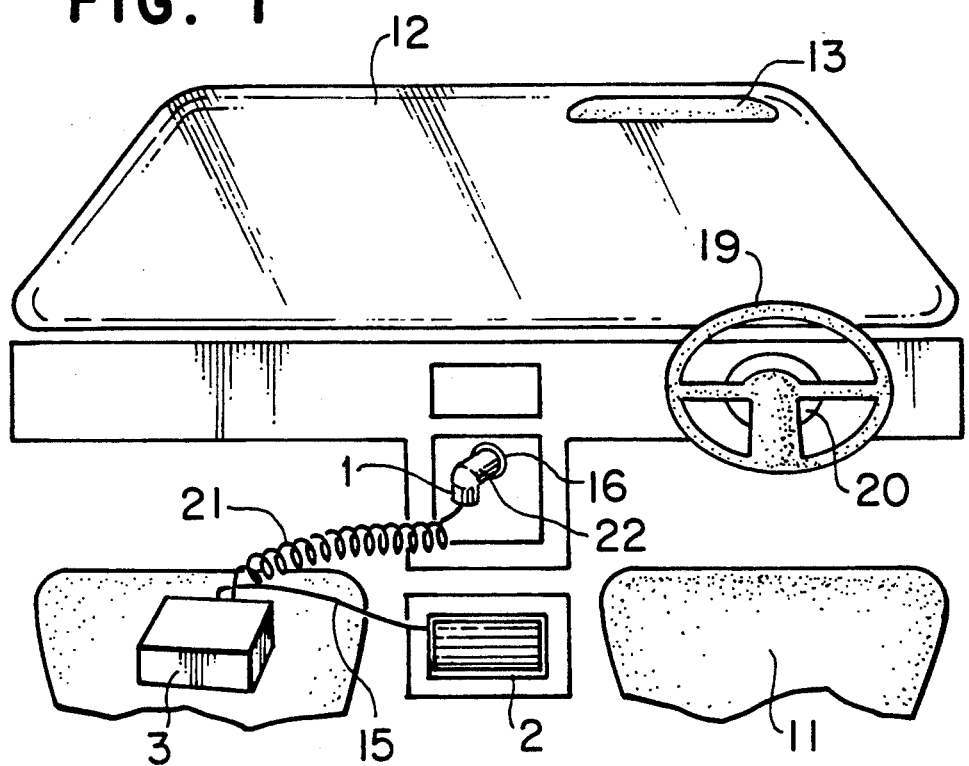
FIG. 1 illustrates how an embodiment of a land mobile radio telephone apparatus according to the present invention is installed in a vehicle.
Figure 2:
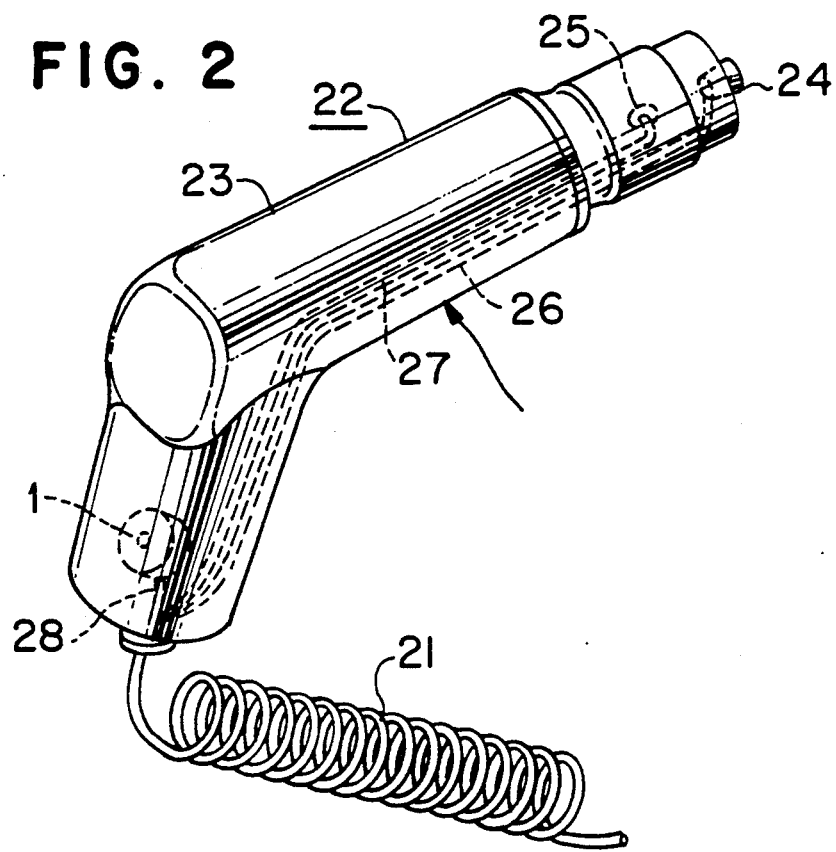
FIG. 2 is an enlarged perspective view of a plug that can be connected to a cigar lighter socket in the land mobile radio telephone apparatus shown in FIG. 1.

A first embodiment of the present invention will be described first with reference to FIGS. 1 and 2. FIG. 1 illustrates how a land mobile radio telephone apparatus is set in a vehicle. FIG. 2 is an enlarged perspective view of a plug connected to a cigar lighter socket.

Figure 9:
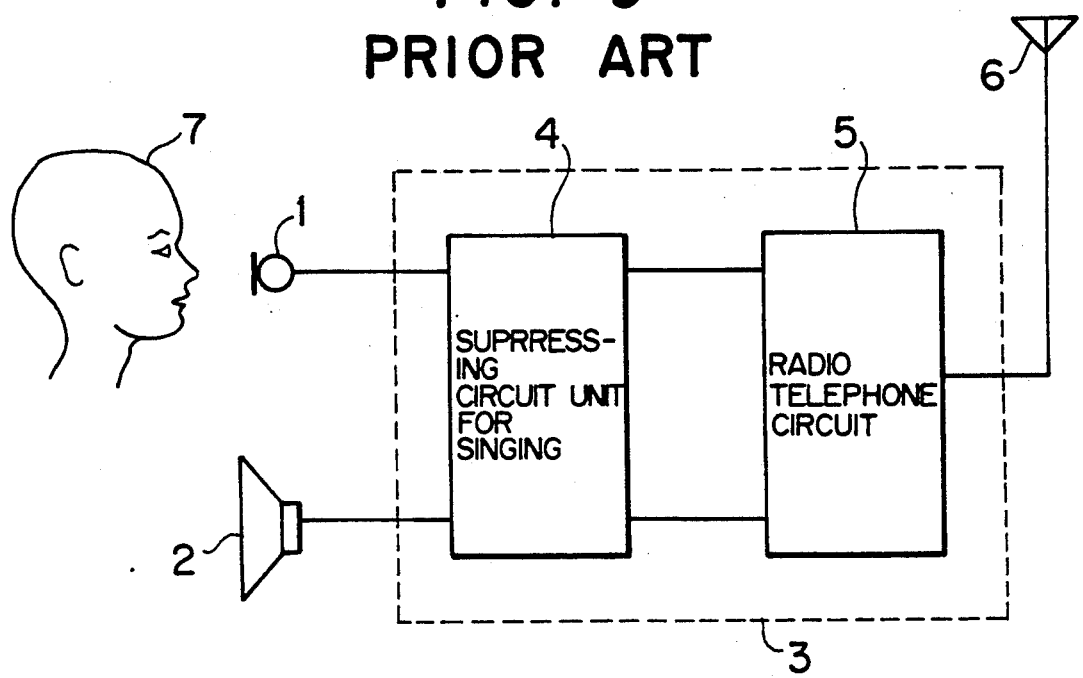
FIG. 9 is a schematic block diagram of a conventional land mobile radio telephone apparatus.
Figure 10:
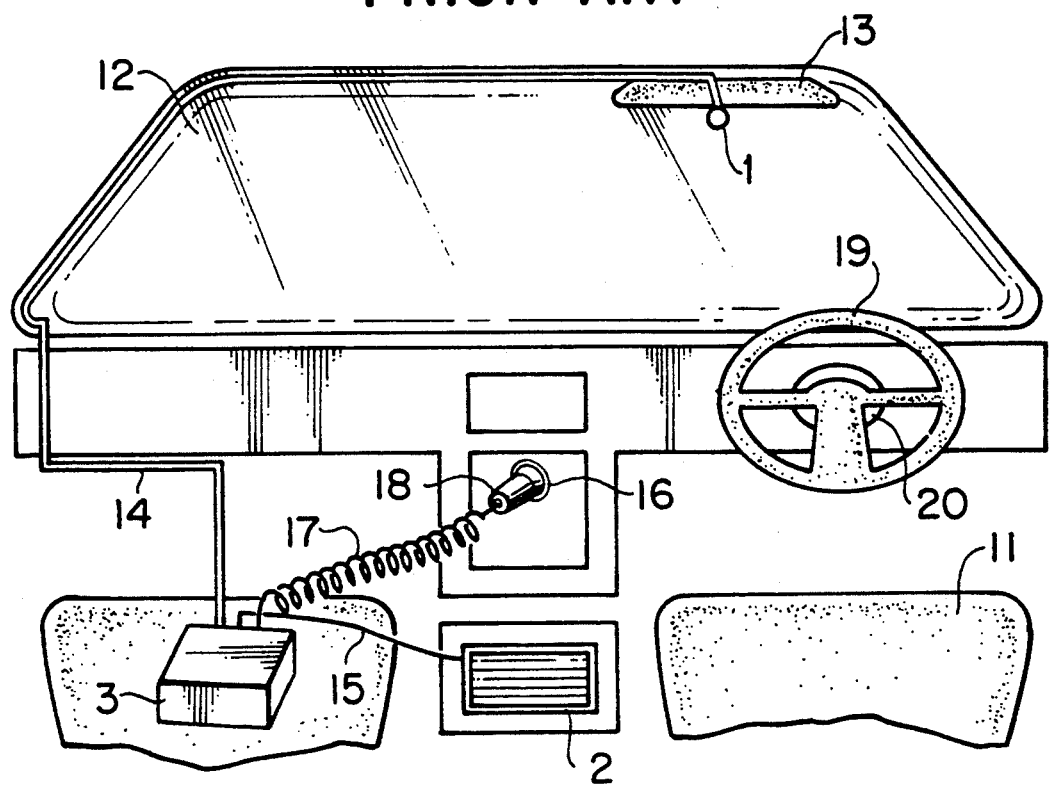
FIG. 10 is a schematic view of the conventional land mobile radio telephone apparatus installed in a vehicle.

The basic configuration and operation of the land mobile radio telephone apparatus according to the present invention are the same as those of the conventional one shown in FIG. 9, description thereof being omitted.

As shown in FIG. 1, the radio telephone apparatus body 3 is installed at a desired side in the vehicle. As provided in the conventional radio telephone apparatus, the radio telephone apparatus body 3 includes the suppressing circuit unit 4 and the radio telephone circuit 5 (see FIG. 9). One end of a cable 21 is connected to the radio telephone circuit 5, and the other end thereof is connected to a plug 22 in which the microphone unit 1 is incorporated. The plug 22 is connected to the cigar lighter socket 16 provided at the central portion of the vehicle and near the driver's seat 11. The plug 22 will be described in detail below with reference to FIG. 2. As shown in FIG. 2, a pair of electrodes 24 and 25 to which power is supplied from the cigar lighter socket 16 are provided at the distal end portion of a casing 23 of the plug 22, and the microphone unit 1 is incorporated in the proximal end portion of the casing 23. Power source cables 26 and 27 respectively connected to the electrodes 24 and 25 and a microphone cable 28 connected to the microphone unit 1 pass through the casing 23 and are connected to the radio telephone apparatus body 3 as a combined cable 21. Consequently, power is supplied from the cigar lighter socket 16 to the radio telephone apparatus body 3 via the power source cables 26 and 27, and the speech voices uttered by the driver are input from the microphone unit 1 to the radio telephone apparatus body 3 via the microphone cable 28.

As shown in FIG. 1, the speaker unit 2 is installed at the central portion of the vehicle and near the driver's seat 11 so as to allow the signal received by the radio telephone apparatus body 3 to be output from the speaker unit 2 via the speaker cable 15 as speech voices.

In FIG. 1, reference numerals 12, 13, 19 and 20 respectively denote the front wind shield, the sun visor, the steering wheel and the steering column.

Figure 3:
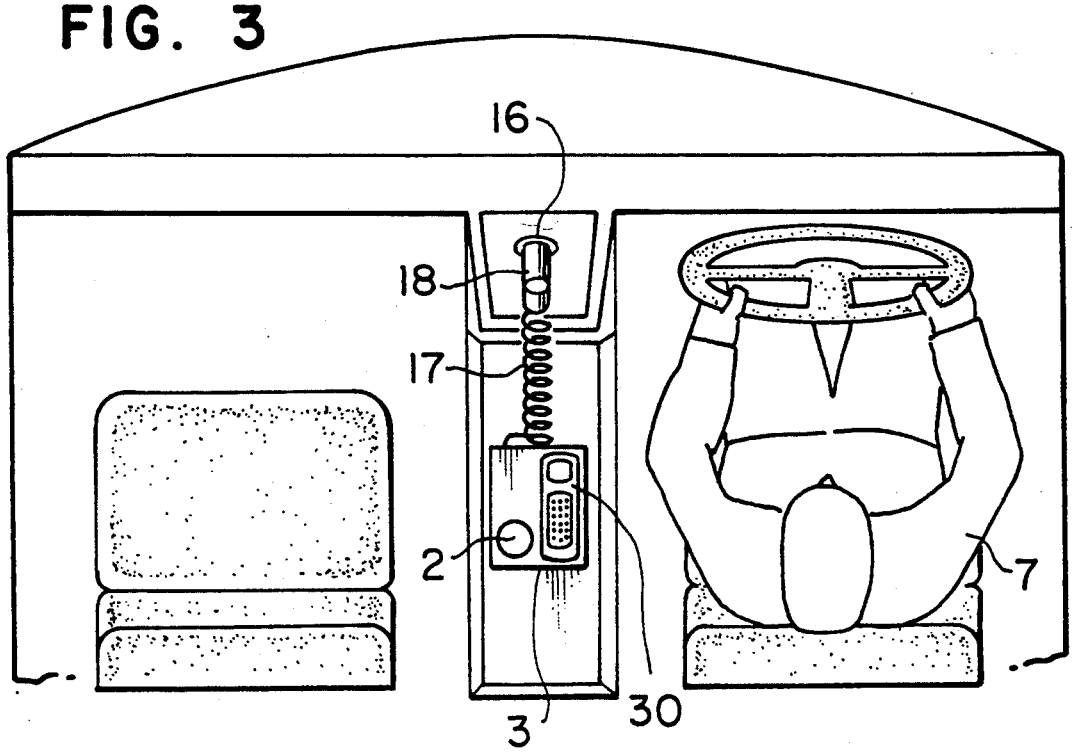
FIG. 3 is a plan view of a land mobile radio telephone apparatus mounted on a driver's seat of the vehicle in which a speaker unit is incorporated.

Alternatively, the land mobile telephone apparatus may be installed in the manner shown in FIG. 3: the radio telephone apparatus body 3 provided with a handset 30 and the speaker 2 are mounted at the driver's seat of the vehicle, which the microphone unit 1 is provided in a cigar lighter plug 18.

In either case, the microphone unit 1 has directivity, that is, the microphone unit 1 is constructed such that, when the cigar lighter plug 22 of the microphone unit 1 is inserted into the cigar lighter socket 16, the microphone unit 1 can be semi-fixed in a state where it exhibits directivity toward the caller. Consequently, when the microphone unit 1 is semi-fixed in a state where it exhibits directivity toward the driver so that the speech voices of the caller can be excellently gathered, the level of the background noise input to the microphone unit 1 is lowered, and telephone conversations of high S/N ratio can be made possible.

The position where the cigar lighter socket 16 is provided may differ depending on the type or size of the vehicle. When the plug 22 is inserted into such a cigar lighter socket 16, directivity of the microphone unit 1 in the cigar lighter plug 22 may be directed to a direction completely different from the direction of the user. This greatly deteriorates the S/N ratio of the aural signal and makes communication between the two parties difficult.

To overcome such a problem, the microphone unit 1 may be constructed such that it can pivot at the illustrated position in two directions and can be semi-fixed when directed in a desired direction. Alternatively, the structure of the lighter plug 22 shown in FIG. 2 may be changed in the manner described below. That is, the power source cables 26 and 27 are led out from the portion of the plug 22 indicated by an arrow in FIG. 2 so that they can be connected to one end of the composite cord 21. The microphone unit 1 is accommodated at the end portion of the lighter plug 22 in a state where it is directed downward. The end portion of the lighter plug 22 is shaped such that it completely blocks noise from entering the microphone unit 1 sideways. The microphone unit 1 is directed to the caller by adjusting the angle of rotation of the cigar lighter plug 22 relative to the plane perpendicular to the shaft of the cigar lighter socket 16 and is semi-fixed in that direction.

Figure 4:
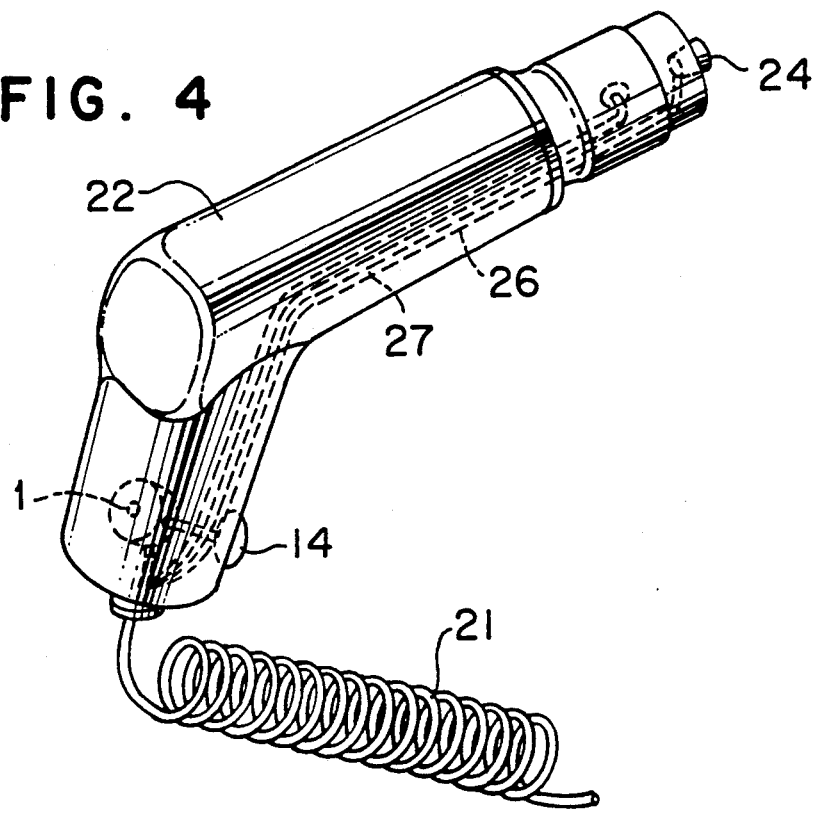
FIG. 4 is a perspective view of a cigar lighter plug showing another embodiment of the land mobile radio telephone apparatus according to the present invention.
Figure 5:
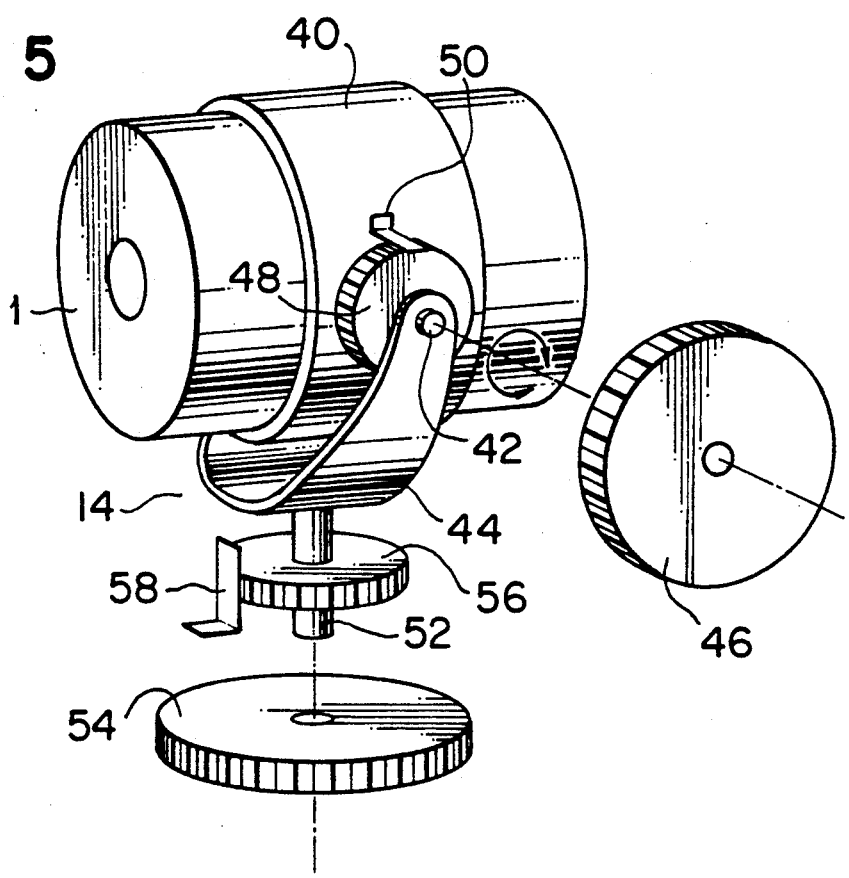
FIG. 5 is a perspective view of a directivity adjusting mechanism used in the radio telephone apparatus shown in FIG. 4.

In the cigar lighter plug 22 shown in FIG. 4, the microphone unit 1 is mounted at the proximal end portion thereof by means of a directivity adjusting mechanism 14. The directivity adjusting mechanism 14 has a cylindrical frame 40 within which the microphone unit 1 is mounted, as shown in FIG. 5. Support shafts 42 protrude from the opposed portions of the outer peripheral surface of the frame 40, and are pivotally supported by the two ends of a support frame 44 having substantially a U-shape. One of the support shafts 42 projects to the outside of the cigar lighter plug 22, and a knob 46 for adjusting the rotation of the microphone unit 1 is mounted on the distal end portion of that support shaft 42.

A disk 48 having a toothed outer peripheral surface is fixed to one end of the support shaft 42, and a stopper 50 mounted on the frame 40 is pressed against the outer peripheral surface of the disk 48, by which the microphone unit 1 can be held at an adjusted position.

A rotary shaft 52 projects from a curved portion of the support frame 44. The distal end of the rotary shaft 52 projects to the outside of the cigar lighter plug 22, and a knob 54 for rotating the support frame 44 is mounted on the distal end portion of the rotary shaft 52.

A stopper 59 to which a disk 56 having a toothed outer peripheral surface is pressed against the rotary shaft 52, by which the support frame 44 can be held at an adjusted position.

The operation of the direction adjusting mechanism 14 will be described below. As mentioned above, when the cigar lighter plug 22 is inserted into the cigar lighter socket 16 provided in front of the driver's seat, the directivity of the microphone unit 1 incorporated in the cigar lighter plug 22 may not be directed toward the user depending on the type or size of the vehicel. In that case, direction of the microphone unit 1 is adjusted such that the directivity of the microphone unit 1 is directed toward the user by rotating the knobs 46 and 54 provided on the outside of the cigar lighter plug 22.

Consequently, the user's speech voices can be effectively gathered by the microphone unit 1, and an aural signal whose S/N ratio has not been deteriorated can thus be transmitted to a remote party.

Figure 6:
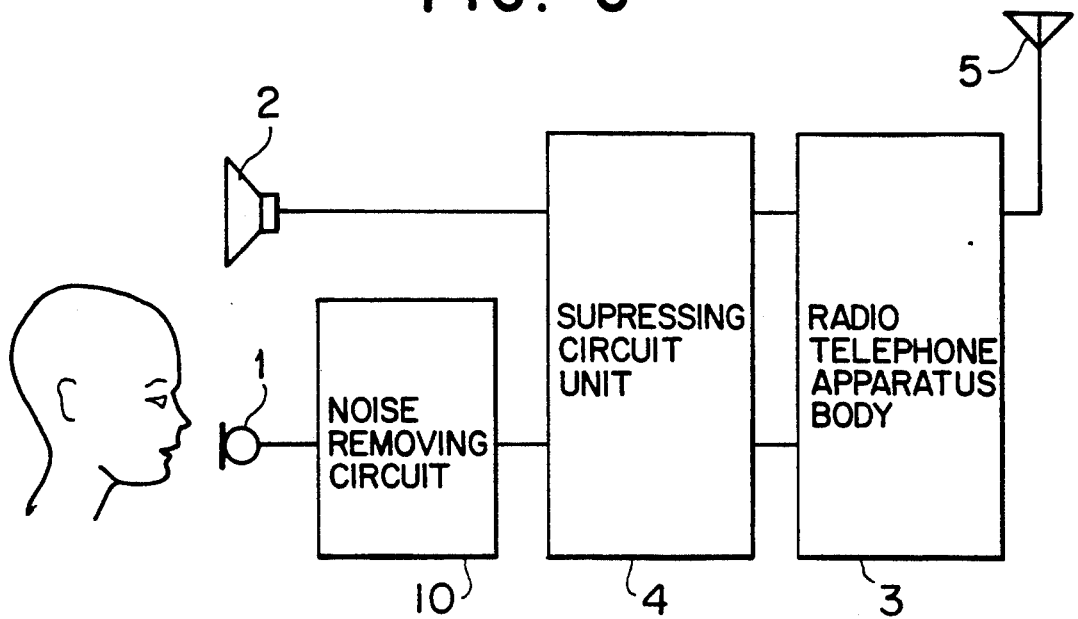
FIG. 6 is a block diagram of still another embodiment of the land mobile radio telephone apparatus according to the present invention.

A second embodiment of the present invention will be described below with reference to FIG. 6. As shown in FIG. 6, the microphone unit 1 for inputting speeches to be transmitted is provided in the cigar lighter plug 22 which can be inserted into the cigar lighter socket 16 provided in front of the driver's seat so as to convert the user's speech voices into an aural signal. An undesired noise in the interior of the vehicle is also input to the microphone unit 1, and is mixed into the aural signal.

The aural signal with noise mixed thereinto is input to a noise removing circuit 10 shown in FIG. 6.

The noise removing circuit 10 removes noise in the aural signal and thereby increases the S/N ratio of the aural signal. The aural signal whose S/N ratio has been increased by the noise removing circuit 10 is input to a radio telephone apparatus body 3 through a suppressing circuit unit 4 for suppressing singing caused by sound coupling, and is then transmitted to a remote party from the antenna 5 in the form of electromagnetic waves.

The electromagnetic waves transmitted by the remote party are received by the antenna 5 and are then input to the radio telephone apparatus body 3 which converts it into an aural signal.

The aural signal passes through the suppressing circuit unit 4 and is radiated into the interior of the vehicle from the speaker unit 2 provided in the radio telephone apparatus body 3 for outputting the received speech voices. The user can heat that speech voice.

In the radio telephone apparatus arranged in the manner mentioned above, even when an undesired noise in the vehicle is gathered by the microphone unit 1 due to provision of the microphone unit 1 at a site spaced from the user 7, the noise generated by the undesired noise is removed by the noise removing circuit 10, and an aural signal of a high S/N ratio can thus be converted into electromagnetic waves by the radio telephone apparatus body 3. Such electromagnetic waves are transmitted to the remote party.

Figure 7:
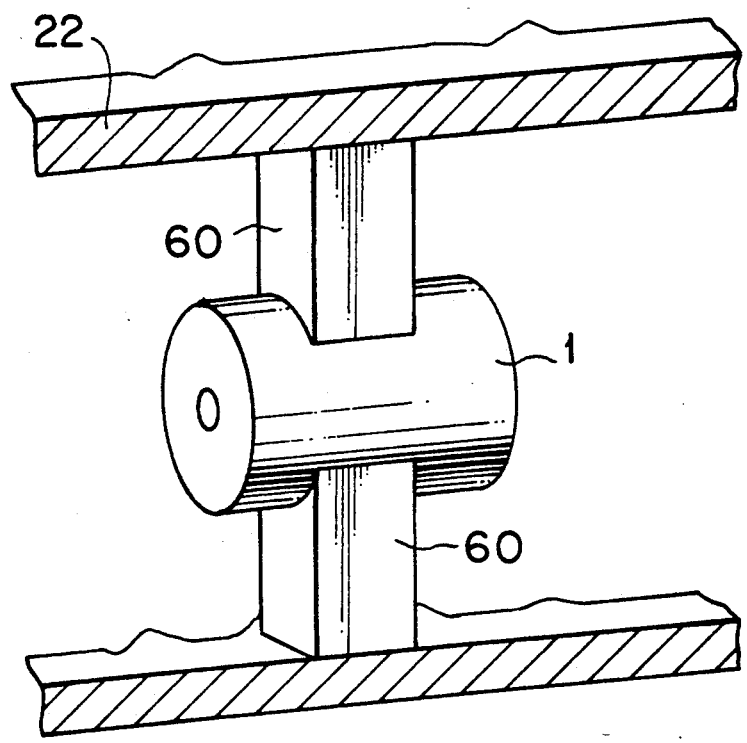
FIG. 7 is a perspective view illustrating how a microphone unit is fixed in the cigar lighter plug in the land mobile radio telephone apparatus.

The cigar lighter plug 22 in which the microphone unit 1 is incorporated is removably mounted in the cigar lighter socket 16 provided in front of the driver's seat of the vehicle, as shown in FIG. 7. The microphone unit 1 is mounted in the cigar lighter plug 22 by means of a plurality of microphone supporting members 60. In that case, since the microphone unit 1 is directly fixed to the cigar lighter plug 22 by means of the supporting members 60, vibrations generated during travel may be transmitted to the cigar lighter plug 22 through the cigar lighter socket 16, generating the noise in the microphone unit 1. That noise is transmitted to the remote party together with the aural signal. Consequently, the S/N ratio of the speech voice transmitted to the remote party is reduced. Such a speech voice may not be heated well over the radio telephone.

Figure 8:
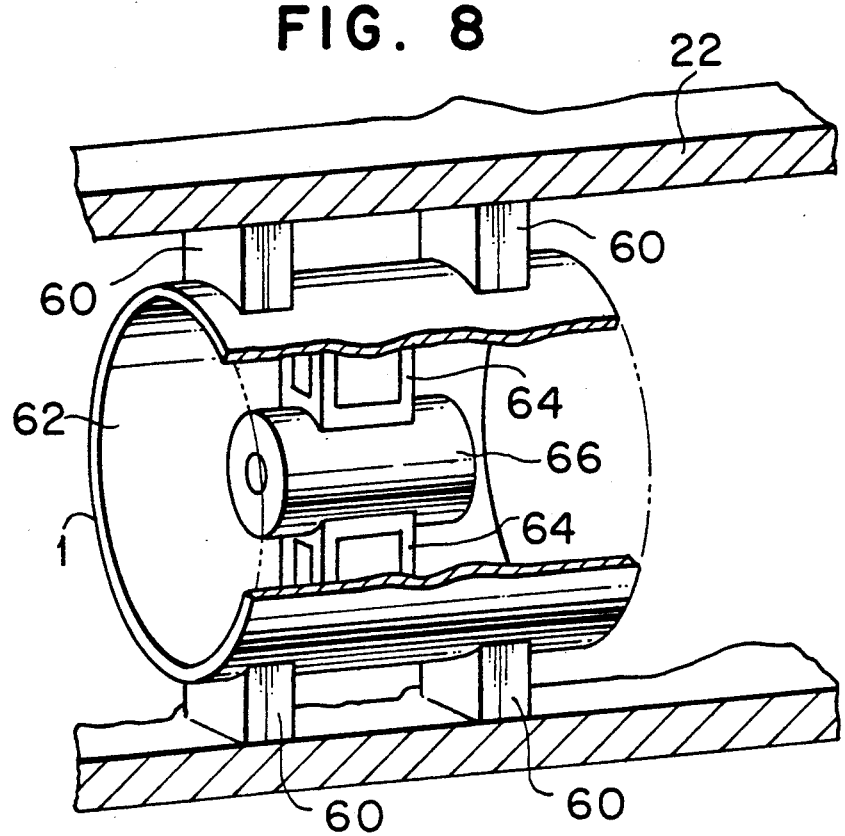
FIG. 8 is a perspective view, partly broken away, of the microphone unit for inputting the speech voice to be transmitted in the embodiment shown in FIG. 7.

To overcome the aforementioned problem, as shown in FIG. 8, the outer peripheral surface of a cylindrical casing 62 of the microphone unit 1 is supported by a microphone supporting member 60 made of an elastic member which is characterized in that it absorbs vibrations, such as a rubber. Also, a plurality of microphone supporting members 64 formed of the same material as the microphone supporting members 60 are provided within the casing 62 so as to support a microphone body 66 substantially at the center of the casing 62. The microphone body 66 is connected to the radio telephone apparatus body 3 via both the connecting wires 26 and 27 installed in the cigar lighter plug 22 and the cable 21 for connecting the cigar lighter plug 22 to the radio telephone apparatus body 3.

In the aforementioned structure, although the cigar lighter plug 22 in which the microphone unit 1 is incorporated is inserted into the cigar lighter socket 16 in use, since the casing 62 and microphone body 66 of the microphone unit 1 are respectively supported by means of the microphone supporting members 60 and 64 exhibiting the vibration proofing effect, the vibrations generated during travel are not transmitted to the microphone unit 1. Consequently, noise caused by vibrations is eliminated, and an aural signal having a high S/N ratio can thus be transmitted to the radio telephone apparatus body 3.

As will be understood from the foregoing description, in the present invention, since the microphone unit for inputting the speech voices to be transmitted is incorporated in the plug that can be coupled to the cigar lighter socket provided near the driver's seat of the vehicle while the plug with the microphone unit therein is connected to the radio telephone apparatus body via the power supply cables and the speech inputting cable, the microphone cable installation work can be eliminated. Consequently, the apparatus installation work is improved, and interruption of the driving operation by removal of the microphone cable from its fixed position, which would occur in a conventional apparatus, can be prevented.

Furthermore, since the speaker unit for outputting the received speech voices is incorporated in the radio telephone apparatus body, the speaker unit installation work and speaker cable installation work can be eliminated. Consequently, the apparatus installation work is improved, and interruption of the driving operation by removal of the microphone cable from its fixed position, which would occur in a conventional apparatus, can be prevented.

Furthermore, in the land mobile telephone apparatus according to the present invention, the background noise generated in the interior of the vehicle when a telephone call is made without use of a hand-held handset can be eliminated, and the S/N ratio of the telephone conversations can thus be increased.

Furthermore, since the directivity of the microphone unit incorporated in the cigar lighter plug can be readily adjusted by means of the directivity adjusting mechanism, directivity of the microphone unit can be accurately directed toward the user even when the type or size of the vehicle changes.

Consequently, even when a telephone call is made in an environment of a high noise level, an aural signal of a high S/N ratio can be transmitted to a remote party, and clear telephone conversations can thus be transmitted to the remote party.

Furthermore, even when the microphone unit gathers can undesired noise in the vehicle, the noise caused by this undesired noise can be removed by the noise caused by this undesired noise can be removed by the noise removing circuit, and an aural signal of a high S/N ratio can thus be transmitted to the remote party.

Consequently, even when a telephone call is made in an environment of a high noise level, an aural signal of a high S/N ratio can be transmitted to a remote party, and clear telephone conversations can thus be transmitted to the remote party.

Furthermore, since the microphone unit provided in the cigar light plug is supported by the microphone supporting members having a vibration proof effect, vibrations caused during travel are not transmitted directly to the microphone unit.

Consequently, a level of the noise caused by the vibrations can be reduced, and clear speech voices can be heard from the land mobile telephone apparatus.

What is claimed is:

1. A land mobile radio telephone apparatus, comprising a microphone unit for inputting speech voices to be transmitted, said microphone unit being incorporated in a plug for insertion into a cigar lighter socket provided near a driver's seat in a vehicle, and a radio telephone apparatus body to which the plug with said microphone unit built therein is connected via cables for supplying power from a power source and a cable for inputting the speech voices.

2. A land mobile radio telephone apparatus, comprising a microphone unit for inputting speeches to be transmitted, said microphone unit being incorporated in a plug for insertion into a cigar lighter socket provided near a driver's seat in a vehicle, a radio telephone apparatus body to which the plug with said microphone unit built therein is connected via cables for supplying power from a power source and a cable for inputting the speeches, and a speaker unit for outputting received voices being built in said radio telephone body.

3. A land mobile radio telephone apparatus to which power is supplied from a vehicle-mounted battery through a cigar lighter plug for insertion into a cigar lighter socket, wherein said cigar lighter socket has an end portion of a casing thereof, said end portion being shaped in a tubular form, wherein a microphone having a directivity is incorporated in said tubular end portion in such manner that it can be semi-fixed, and wherein the directivity of the microphone is directed toward a driver.

4. A land mobile radio telephone apparatus comprising a radio telephone apparatus body disposed in a vehicle, power being supplied to said apparatus body via cables from a cigar lighter plug for insertion into a cigar lighter socket provided in front of a driver's seat in the vehicle, a microphone unit incorporated in said cigar lighter plug for inputting speeches to be transmitted, and a speaker unit for outputting received speeches and a circuit unit for suppressing sound coupling of said microphone unit and said speaker unit, said speaker unit and said suppressing circuit being provided in said radio telephone apparatus body, wherein the microphone unit for inputting speeches to be transmitted, said microphone unit having an adjustable directivity, is provided in said cigar lighter plug by means of a directivity adjusting mechanism.

5. A land mobile radio telephone apparatus according to claim 4, further comprising a noise removing circuit for removing noise mixed into an aural signal and generated by an undesired noise input from said microphone unit, said noise removing circuit being provided between said microphone unit and said sound coupling suppressing circuit unit.

6. A land mobile radio telephone apparatus according to claim 4, wherein the microphone unit provided in said cigar lighter plug is supported by a microphone supporting member exhibiting a vibration-proof effect.

* * * * *